(12) United States Patent
Fernald et al.

(10) Patent No.: US 7,343,504 B2
(45) Date of Patent: Mar. 11, 2008

(54) MICRO CONTROLLER UNIT (MCU) WITH RTC

(75) Inventors: Kenneth W. Fernald, Austin, TX (US); Donald E. Alfano, Round Rock, TX (US)

(73) Assignee: Silicon Labs CP, Inc., Austin, TX (US)

( * ) Notice: Subject to any disclaimer, the term of this patent is extended or adjusted under 35 U.S.C. 154(b) by 207 days.

(21) Appl. No.: 10/881,793

(22) Filed: Jun. 30, 2004

(65) Prior Publication Data

US 2006/0005054 A1    Jan. 5, 2006

(51) Int. Cl.
*G06F 1/26* (2006.01)

(52) U.S. Cl. ...................... 713/322; 327/291

(58) Field of Classification Search ................ 713/322; 327/291
See application file for complete search history.

(56) References Cited

U.S. PATENT DOCUMENTS 6,021,501 A * 2/2000 Shay ........................... 713/322
6,067,627 A * 5/2000 Reents ........................ 713/324
6,194,940 B1 * 2/2001 Hunter et al. ............... 327/298

OTHER PUBLICATIONS

National Semiconductor, DP8573A Real Time Clock (RTC), May 1993.*

National Semiconductor, NS486SXF Optimized 32-Bit 486-Class Controller with On-Chip Peripherals for Embedded Systems, Feb. 1997.*

* cited by examiner

Primary Examiner—Chun Cao
Assistant Examiner—Albert Wang
(74) Attorney, Agent, or Firm—Howison & Arnott, L.L.P.

(57) ABSTRACT

A microcontroller unit (MCU) is disclosed with a stand-alone Real Time Clock (RTC). The MCU includes a processing circuit for receiving digital information and processing said received digital information. A primary clock circuit provides the timing for the processing circuit. A power control circuit controls the power to the processing circuit and the primary clock circuit to control the operation thereof to operate in at least a full power mode drawing a full power level from a supply voltage input and a reduced power mode drawing less than the full power level from the supply voltage input. A stand-alone RTC circuit is also provided, the stand-alone RTC circuit including an RTC clock circuit operating independent of the primary clock circuit. A timer clocked by the RTC clock circuit is operable to increment a stored time value for output therefrom, the RTC clock circuit having a defined time base. An input/output (I/O) device provides access by the processing circuit to the results output by the timer. A power management circuitry manages the power to the stand-alone RTC circuit, such that the RTC clock circuit, the timer, and the I/O device operate regardless of the power mode of operation of the processing circuitry and the primary clock circuit.

28 Claims, 6 Drawing Sheets

MICRO CONTROLLER UNIT (MCU) WITH RTC

TECHNICAL FIELD OF THE INVENTION

The present invention pertains in general to microcontroller units (MCUs) having associated therewith analog and digital circuitry in a mixed-signal construction and, more particularly, to the timing functions associated therewith that provide real time clock functionality.

CROSS-REFERENCE TO RELATED APPLICATIONS

N/A

BACKGROUND OF THE INVENTION

The requirement for data collection usually involves the operation of receiving analog data, converting that analog data to a digital format, and then processing the data in the digital format for conversion thereof or storage thereof. A class of devices has been developed for such applications that utilize mixed-signal technology to provide a "system-on-a-chip" (SOC) solution. These SOCs, sometimes referred to as microcontroller units (MCUs), are comprised of a digital section and may include an analog section. The analog section typically includes an analog-to-digital converter that may have the input thereof multiplexed such that it can sample analog values from a plurality of different sources, such as various sensors or transducers. These MCUs are designed to operate on very low power, such that they can be disposed in remote areas and then run off of battery power for long durations of time. Since sampling of data is a rather intermittent operation, it is advantageous for these devices to have the ability to enter into a low power operating mode. The power budget for these types of MCU chips is divided among a number of functional elements. On the digital side, the processor has a large number of gates and typically requires a relatively high frequency of operation to provide adequate capabilities, on the order of 25 MHz. There also a plurality of timers, Input/Output (I/O) devices, etc., but the largest portion of the power budget is the processor. The clock circuitry can also take up a fair portion of the power budget, even when not driving the processor, but the primary portion of the power budget due to the power requirement of the digital processing and the clock speed thereof. These MCUs have clock speeds ranging from 25 MHz to 100 MHz. Even if the processor is not processing information, the clock is still clocking the chip at a relatively high frequency and, as long as gates are being driven to different states, power will be dissipated. Therefore, most of these MCU devices have a low power operating mode which allows the processor or a digital portion thereof to be placed into a very "deep sleep" mode by halting the processing operation or just allow a lower power mode. In the lower power mode, it is sometimes necessary to lower the clock speed down to a low clock operating speed of, for example, 32 kHz. This can allow the processor to continue operating, but at a much lower speed. Further, another source of power draw can be the data converters, analog-to-digital converters (ADCs) and the digital-to-analog converters (DACs) which can be disposed in an analog section. Even though this portion of the chip may operate at a lower clock speed, the time to sample an input at this clock speed might not be acceptable. Therefore, the processor will typically run at the lower clock speed for background processing operations and would be raised to the higher clock speed when doing a sampling operation. Multiple components or functional blocks associated with the MCU could be turned off, depending upon the power management philosophy upon which the part is based. However, the lowest power operation is to place the digital portion in a deep sleep mode wherein the processing operation is substantially terminated, with the configuration information for the "current state" of the processor maintained. An external monitoring circuit will monitor some conditions such as an interrupt generated by another block, an external event, etc., and will then wake up the part and initiate processing at the last current state.

In some applications, a real time clock function is required. This is easily facilitated in the MCU running at the high speed, since there are typically provided timers and the such on-board that can be clocked by a high frequency clock. One type of MCU that provides for this is the family of MCU products, C8051FXXX, manufactured by Silicon Laboratories Inc. However, to provide the real time clock functionality, the count must be segmented, or perceived in some way such that it can count seconds, minutes, hours, days, etc. and stored in a register. Typically, the entire real time clock function could be carried out in the background with a low frequency clock. In some of these MCU devices, there is provided a high frequency clock for operating the processor in the default operating mode which is the high power operating mode and a low frequency clock for operating the processor in the low power mode. A low frequency clock can be utilized to clock the timers independent of the operation of the processor and then an interrupt generated. However, the functionality of the real time clock basically takes advantage of the operation of the entire digital section. As such, in very low power applications wherein it is desirable to have time-stamp information on samples that are taken, the real time clock must be run during the very low power mode. Therefore, it would be desirable to have none or very little of the digital section operating during this time.

SUMMARY OF THE INVENTION

The present invention disclosed herein comprises, in one aspect thereof, a microcontroller unit (MCU) with a stand-alone Real Time Clock (RTC). The MCU includes a processing circuit for receiving digital information and processing said received digital information. A primary clock circuit provides the timing for the processing circuit. A power control circuit controls the power to the processing circuit and the primary clock circuit to control the operation thereof to operate in at least a full power mode drawing a full power level from a supply voltage input and a reduced power mode drawing less than the full power level from the supply voltage input. A stand-alone RTC circuit is also provided, the stand-alone RTC circuit including an RTC clock circuit operating independent of the primary clock circuit. A timer clocked by the RTC clock circuit is operable to increment a stored time value for output therefrom, the RTC clock circuit having a defined time base. An input/output (I/O) device provides access by the processing circuit to the results output by the timer. A power management circuitry manages the power to the stand-alone RTC circuit, such that the RTC clock circuit, the timer, and the I/O device operate regardless of the power mode of operation of the processing circuitry and the primary clock circuit.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
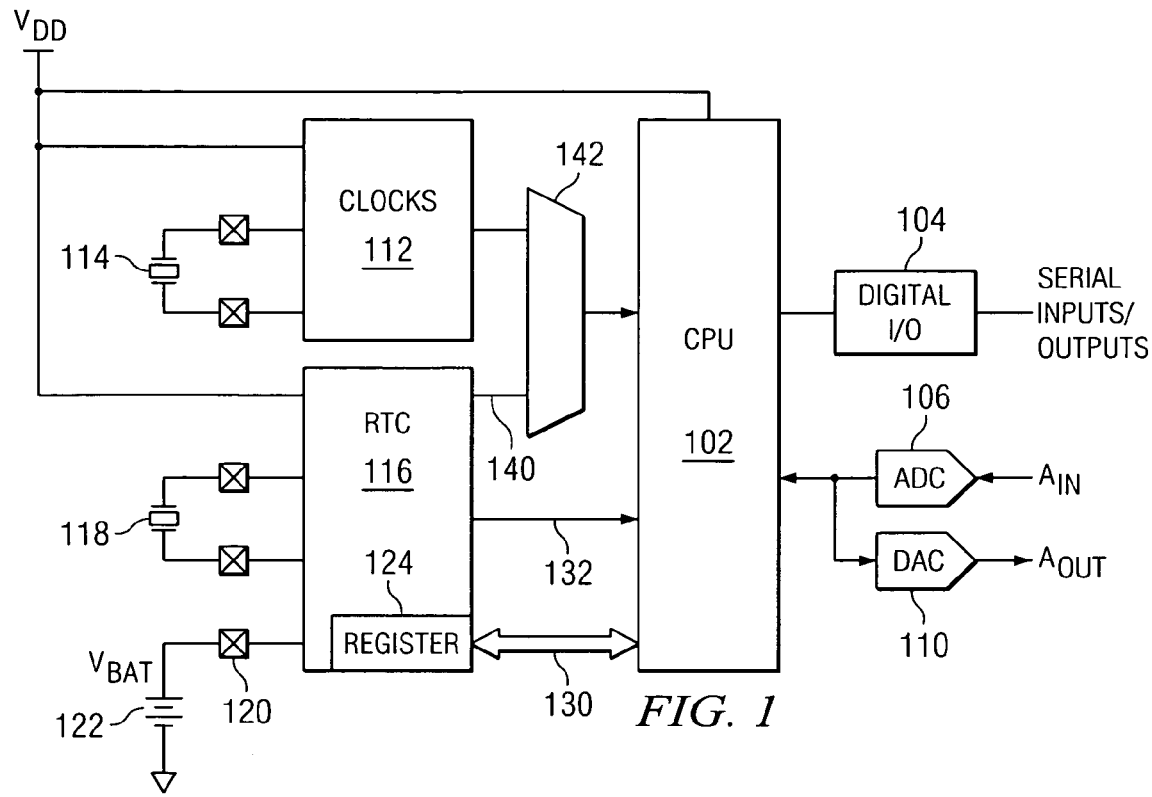
FIG. 1 illustrates an overall diagram view of an MCU with a separate low power real time clock (RTC)

Referring now to FIG. 1, there is illustrated a block diagram of a processor-based system that drives the mixed signal technologies that include as a part thereof, a digital section including a central processing unit (CPU) 102 and a digital I/O section 104 that is operable to interface with various serial inputs and outputs. The system also includes the analog section which provides for an analog-to-digital converter (ADC) 106 that is operable to receive one or more analog inputs and also provides a digital-to-analog converter (DAC) 110 for allowing digital information from the CPU 102 to be converted to analog output information. The operation of the CPU 102 is controlled by various clocks 112 in a primary oscillator section. These are the operational clocks that control the overall operation of the MCU. In one mode, they will be interfaced with a crystal 114 for precision operation thereof. However, as will be described herein below, a precision internal non-crystal based clock can be utilized and, further, there can be a high frequency crystal and a low frequency crystal for two different operational modes. Normally, the output of the block 112 provides the operating clock with the CPU 102.

There is also provided a separate stand alone real time clock (RTC) block 116. This clock 116 operates on a separate RTC crystal 118 that provides the time base therefor. The RTC 116 interfaces with the chip supply voltage $V_{DD}$, which also drives CPU 102 and the clock block 112. The RTC block 116 also interfaces with a battery terminal 120 and an external back-up battery 122. The RTC 116 has disposed thereon a plurality of registers and RAM memory 124, which are operable to store the timing information associated with the RTC 116. The RTC 116 operates independently with the primary purpose being to maintain current time and date information therein separate and independent of the operation of the digital and analog sections and the power required thereby or provided thereto. This information can be initialized by the CPU 102 through a digital interface 130 with the registers 124. During operation, the RTC 116 will update its internal time and date information, which information is stored in the registers 124. The RTC 116 is operable to generate an interrupt on an interrupt line 132 (to the CPU 102). Therefore, the RTC 116 can interface with the CPU 102 in order to generate an interrupt thereto. As will be described herein below, this interrupt facilitates waking the CPU 102 up when it is placed into an inactive or deep sleep mode. However, the CPU 102 at any time can query the register 124 for information stored therein. The RTC 116, as will also be described herein below, is a very low power circuit that draws very little current, the current less than 1.0 µA. The RTC 116 provides a clock output on a line 140 to a clock multiplexer 142. The multiplexer 142 also receives the output of the clock circuit 112, the output of the multiplexer providing the system clock to the CPU 102. The clock circuit 112 is operable to generate a base frequency of around 25 MHz that can be multiplied or divided. However, the base operating frequency of the RTC 116 of around 32 kHz can provide an alternate low frequency time base for the system clock. This will allow the CPU 102 to operate at a low frequency for power conservation purposes.

Figure 2:
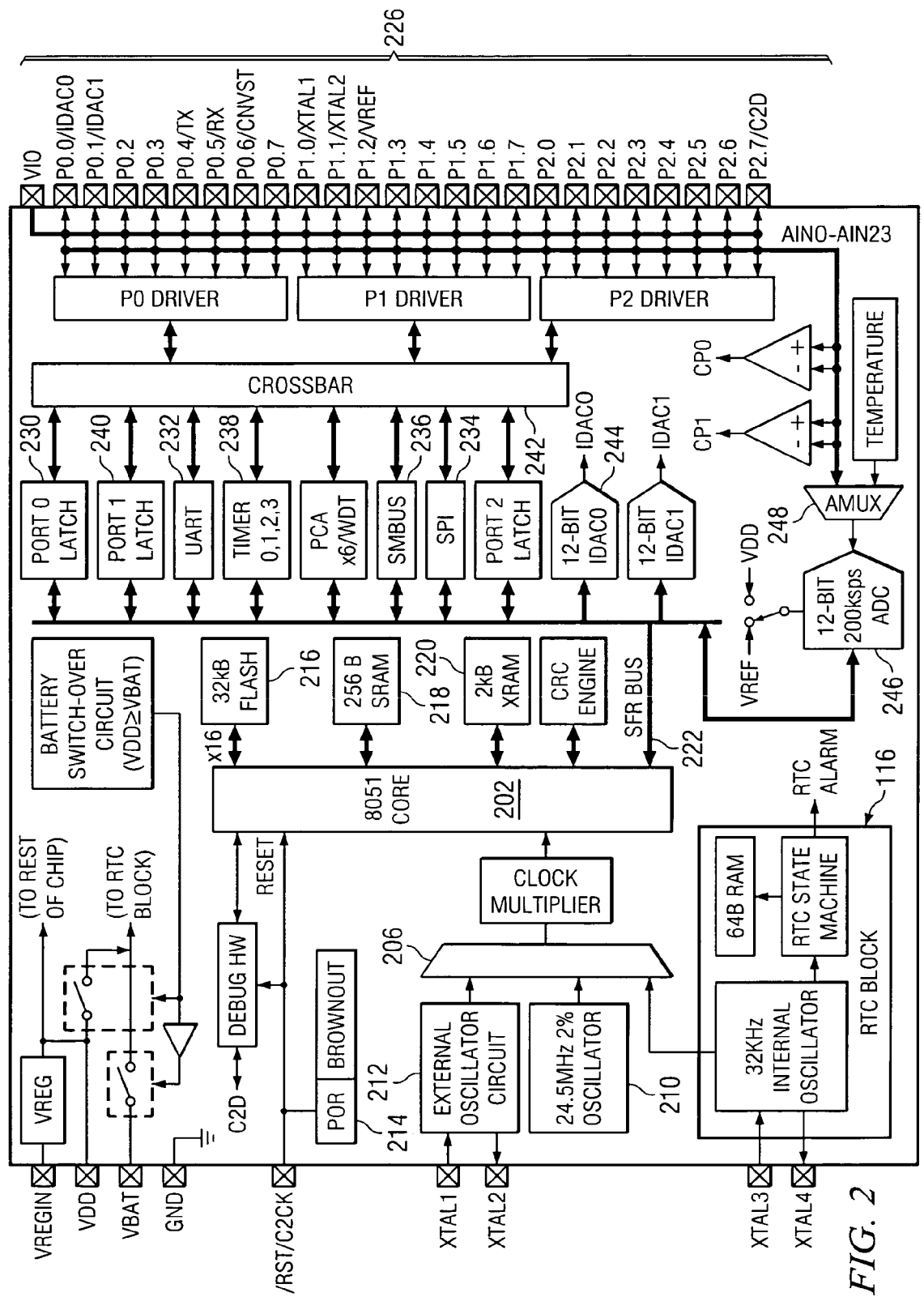
FIG. 2 illustrates an overall block diagram of the MCU chip showing the various functional blocks thereof.

Referring now to FIG. 2, there is illustrated a block diagram of the MCU. As noted herein above, the MCU is generally of the type similar to part number C8051F330/1 manufactured by Silicon Laboratories Inc., with the exception of the addition of the RTC 116. The MCU includes in the center thereof a processing core 202 which is typically comprised of a conventional microprocessor of the type "8051." The processing core 402 receives a clock signal on a line 204 from a multiplexer 206. The multiplexer 206 is operable to select among multiple clocks. There is provided an 80 kHz internal oscillator 208, a 24.5 MHz trimmable internal precision oscillator 212 or an external crystal controlled oscillator 210. The precision internal oscillator 212 is described in U.S. patent application Ser. No. 10/244,344, entitled "PRECISION OSCILLATOR FOR AN ASYNCHRONOUS TRANSMISSION SYSTEM," filed Sep. 16, 2002, which is incorporated herein by reference. The processing core 202 is also operable to receive an external reset on terminal 213 or is operable to receive the reset signal from a power-on-reset block 214, all of which provide a reset to processing core 202. The processing core 202 has associated therewith a plurality of memory resources, those being either flash memory 216, SRAM memory 218 or random access memory 220. The processing core 202 interfaces with various digital circuitry through an on-board digital bus 222 which allows the processing core 202 to interface with various operating pins 226 that can interface external to the chip to receive digital values, output digital values, receive analog values or output analog values. Various digital I/O circuitry are provided, these being latch circuitry 230, serial port interface circuitry, such as a UART 232, an SPI circuit 234 or an SMBus interface circuit 236. Three timers 238 are provided in addition to another latch circuit 240. All of this circuitry 230-240 is interfacable to the output pins 226 through a crossbar device 242, which is operable to configurably interface these devices with select ones of the outputs. The digital input/outputs can also be interfaced to a digital-to-analog converter 244 for allowing a digital output to be converted to an analog output, or to the digital output of an analog-to-digital converter 246 that receives analog input signals from an analog multiplexer 248 interfaced to a plurality of the input pins on the integrated circuit. The analog multiplexer 248 allows for multiple outputs to be sensed through the pins 226 such that the ADC can be interfaced to various sensors. Again, the MCU 102 is a conventional circuit.

Figure 3:
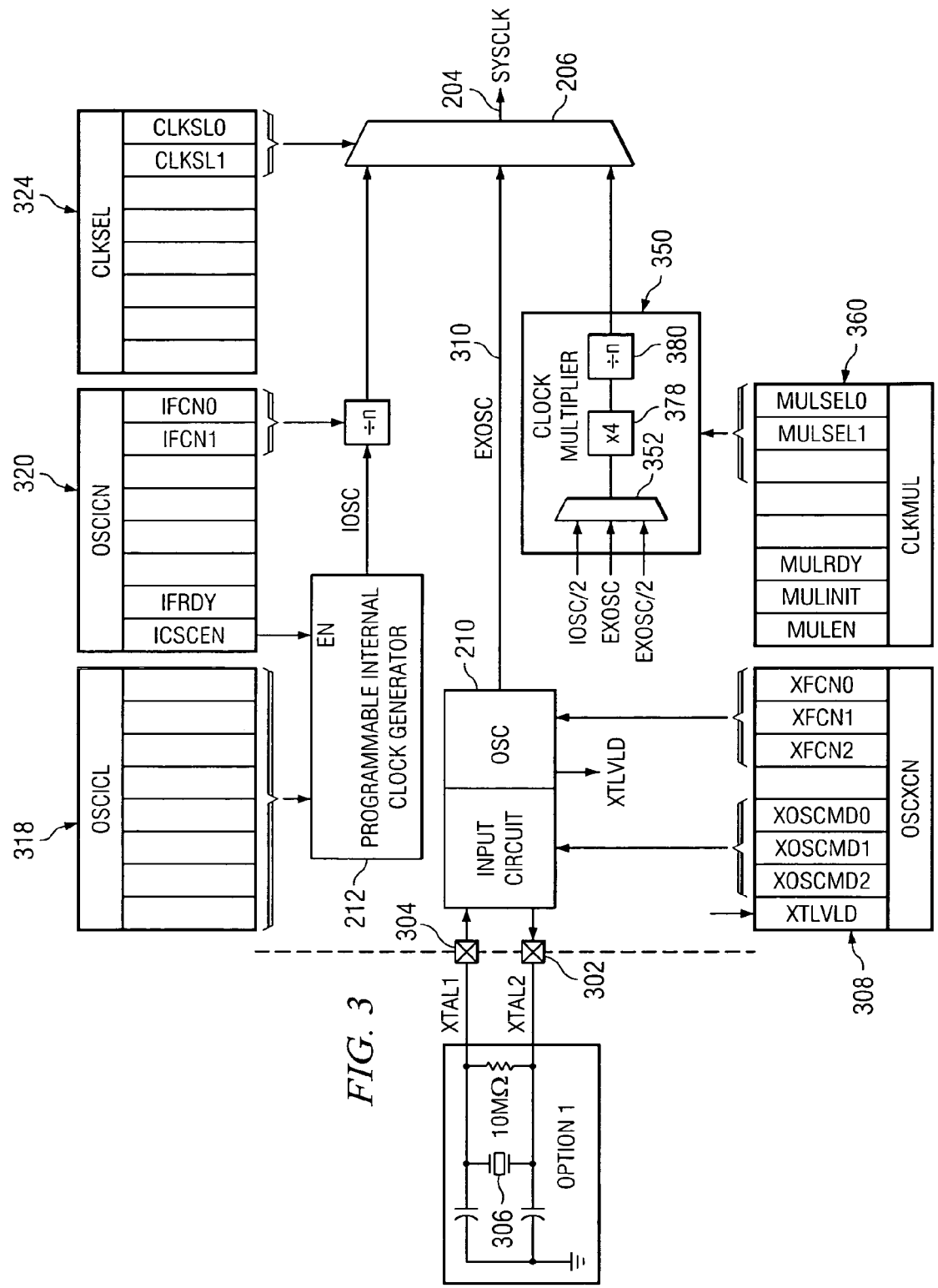
FIG. 3 illustrates a block diagram of the oscillators utilized for the processing operation of the MCU.

Referring now to FIG. 3, there is illustrated a schematic diagram of the primary oscillator section comprised of the oscillators 210 and 212 and the multiplexer 206. The oscillator 210 is a crystal controlled oscillator that is interfaced through two external terminals 302 and 304 to an external crystal 306 and operates up to frequencies in excess of 25 MHz. A register 308 is provided, labeled OSCXCN, which is operable to drive control signals for the oscillator 210 and to record output values thereof. The output of the oscillator 210 is provided on a line 310 to one input of the multiplexer 206. The programmable precision trimmable oscillator 212 is controlled by a register 318 and a register 320 to control the operation thereof, i.e., to both set the frequency thereof and to enable this oscillator. The output of the oscillator 212 is processed through a divide circuit 330, the divide ratio thereof set by bits in the register 320 to provide on an output 322 a precision high frequency clock to another input of the multiplexer 206. The output of the multiplexer 206 is provided to the MCU 102 on the clock line 404 as a system clock signal SYSCLK. The clock select operation is facilitated with a register 324 labeled CLKSEL, which controls the multiplexer 206.

The programmable high frequency oscillator 212 is the default clock for system operation after a system reset. The values in the register 318, labeled OSCICL, provide bits that are typically programmed at the factory, these bits stored in the flash memory. The center frequency of the high frequency clock is 24.5 MHz. The divide circuit 330 can provide a divide ratio of one, two, four or eight. The oscillator 212, in the C8051F330 device by way of example only, is a ±2 percent accuracy oscillator which has a center frequency that, although programmed at the factory, is allowed to be adjusted by changing the bits in the register 318. There are provided seven bits in the register 318 that are calibratable bits. The register 320 provides an enable bit for the oscillator 212 and a bit that determines if the oscillator 212 is running at the programmed frequency. Two bits in the register 320 are utilized to set the divide ratio of the divider 330.

There is also provided a clock multiplier circuit 350, which is comprised of a multiplexer 352 for selecting the output of the clock circuits 210, the internal clock 212 or the clock 210 divided by a factor of 2 and providing the selected clock to a 4× multiplier 378. This multiplied clock is then input to a fractional divide block 380, the output thereof selected by the multiplexer 206. This block 350 is controlled by a select register 360. The select register operates in accordance with the following table:

TABLE 1

CLKMUL: Clock Multiplier Control Register

| R/W MULEN Bit7 | R/W MULINIT Bit6 | R MULRDY Bit5 | R/W Bit4 | R/W MULDIV Bit3 | R/W Bit2 | R/W Bit1 | R/W MULSEL Bit0 |
| --- | --- | --- | --- | --- | --- | --- | --- |

Bit7: MULEN: Clock Multiplier Enable
    0: Clock Multiplier disabled.
    1: Clock Multiplier enabled.
Bit6: MULINIT: Clock Multiplier Initialize
    This bit should be a '0' when the Clock Multiplier is enabled. Once enabled, writing a '1' to this bit will initialize the Clock Multiplier. The MULRDY bit reads '1' when the Clock Multiplier is stabilized.
Bit5: MULRDY: Clock Multiplier Ready
    This read-only bit indicates the status of the Clock Multiplier.
    0: Clock Multiplier not ready.
    1: Clock Multiplier ready (locked).
Bits4-2: MULDIV: Clock Multiplier Output Scaling Factor
    These bits scale the Clock Multiplier output.
    000: Clock Multiplier Output scaled by a factor of 1.
    001: Clock Multiplier Output scaled by a factor of 1.
    010: Clock Multiplier Output scaled by a factor of 1.
    011: Clock Multiplier Output scaled by a factor of $2/3$.
    100: Clock Multiplier Output scaled by a factor of $2/4$ (or $1/2$).
    101: Clock Multiplier Output scaled by a factor of $2/5$.
    110: Clock Multiplier Output scaled by a factor of $2/6$ (or $1/3$).
    111: Clock Multiplier Output scaled by a factor of $2/7$.
Bits1-0: MULSEL: Clock Multiplier Input Select
    These bits select the clock supplied to the Clock Multiplier.

| MULSEL | Selected Input Clock | Clock Multiplier Output for MULDIV = 000b |
| --- | --- | --- |
| 0 | Internal Oscillator/2 | Internal Oscillator × 2 |
| 1 | External Oscillator | External Oscillator × 4 |
| 10 | External Oscillator/2 | External Oscillator × 2 |
| 11 | Internal Oscillator | Internal Oscillator × 4 |

It can be seen that bits 4-2 set the divide ratio for the fractional divide circuit. For values "000," "001" and "010," there will be no fractional divide. For the remaining values, there will be a non integer divide.

Figure 4:
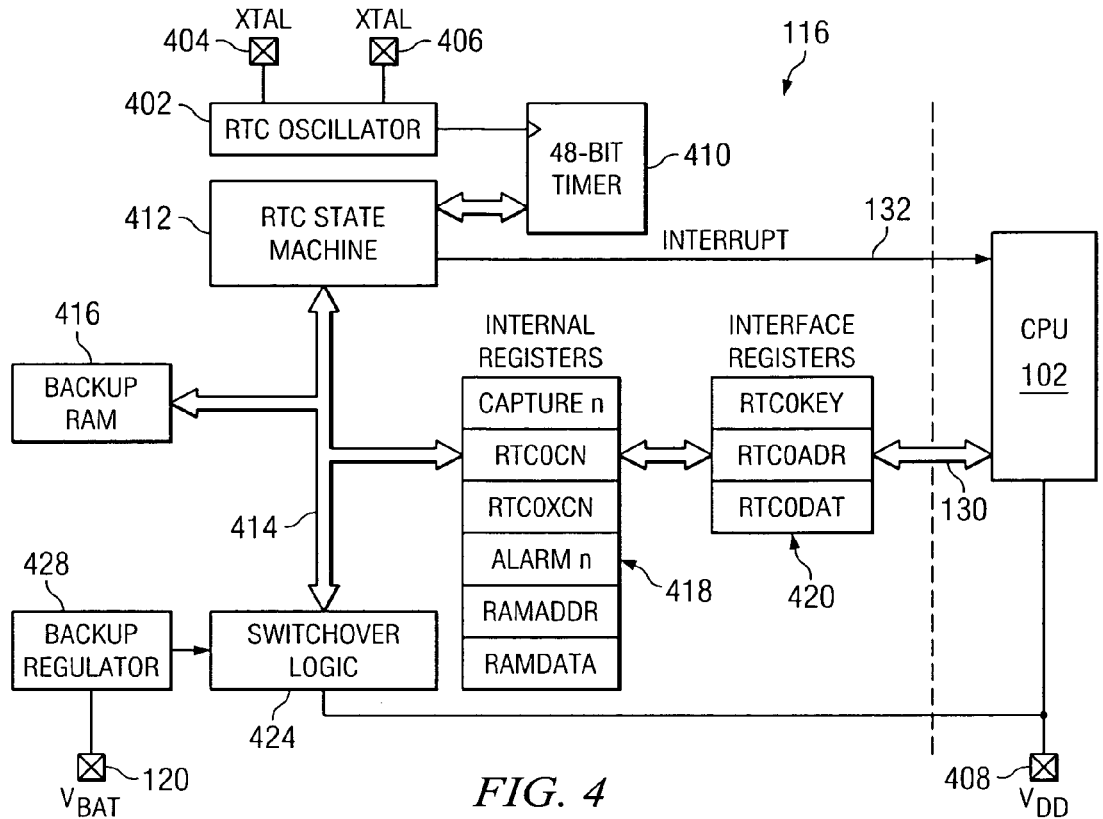
FIG. 4 illustrates a block diagram of the RTC.

Referring now to FIG. 4, there is illustrated a detailed block diagram of the low power RTC 116. There is provided a dedicated RTC oscillator 402 that is operable at a dedicated 32 kHz oscillator Frequency in the crystal mode, it noted that the oscillator can operate in a non crystal mode at a frequency of 20 kHz or 40 kHz. There are provided two external pads 404 and 406 for interfacing with the crystal in a crystal-based mode or they can be connected together in a non-crystal based mode. Then the RTC 116 receives the back-up battery input on the node 120 and supply voltage $V_{DD}$ on a $V_{DD}$ pin 408. A 48-bit timer 410 is provided which is clocked by the RTC oscillator 402. An RTC state machine 412 controls the operation of the RTC 116 and is operable to interface with the 48-bit timer 410 to write data therein or read data therefrom and in general control the configuration thereof. As will be described herein below, the 48-bit timer includes a counter, latches and an alarm function. The RTC state machine 412 is operable to generate the interrupt on the line 132, when necessary, and is interfaced with an RTC internal bus 414. The internal bus 414 is operable to interface with a back-up RAM 416, which is configured with static RAM (SRAM) with a storage capacity of 64 bytes. Storage is provided by internal registers 418 which provide an internal storage for the data captured from the 48-bit timer 410 and various addressing data that is transferred between the RTC state machine 412 and the CPU 102. There is provided an interface register 420 that allows the CPU 102 an interface path to the internal registers 418. There is provided power control with a switch over logic block 424, which is operable to monitor the voltage level of $V_{DD}$ and, if it falls below a predetermined level, it will switch over to a back-up battery on the input terminal 120 (noting that the voltage $V_{DD}$ can be provided by a primary battery). There is provided a regulator circuit 428 that regulates voltage supplied to the RTC circuit in the event of loss of main chip power.

When utilized with a 32.768 kHz watch crystal and a back-up power supply of at least 1V, the RTC 116 allows a maximum of 137 years of time keeping capability with 47-bit operation or 272 years with 48-bit resolution. This is independent of the operation of the overall MCU. Although not shown, the RTC state machine 412 also includes a missing clock detector that can interrupt the processor and the oscillators 118 from the suspend mode, or even generate a device reset when the alarm reaches a predetermined value.

The interface registers 420 include three registers, RTC0KEY, RTC0ADR, and RTC0DAT. These interface registers occupy a portion of the special function register (SFR) memory map of the CPU 102 and provide access to the internal registers 418 of the RTC 116. The operation of these internal registers is listed in the following Table 1 (Table 19.1). The RTC internal registers 418 can only be accessed indirectly through the interface registers 420.

TABLE 1

RTC0 Internal Registers

| RTC Address | RTC Register | Register Name | Description |
| --- | --- | --- | --- |
| 0x00-0x05 | CAPTUREn | RTC Capture Registers | Six Registers used for setting the 48-bit RTC timer or reading is current value. |
| 0x06 | RTC0CN | RTC Control Register | Controls the operation of the RTC State Machine. |
| 0x07 | RTC0XCN | RTC Oscillator Control Register | Controls the operation of the RTC Oscillator. |
| 0x08-0x0D | ALARMn | RTC Alarm Registers | Six registers used to set the 48-bit RTC alarm value. |
| 0x0E | RAMADDR | RTC Backup RAM Indirect Address Register | Used as an index to the 64 byte RTC backup RAM. |
| 0x0F | RAMDATA | RTC Backup RAM Indirect Data Register | Used to read or write the byte pointed to by RAMADDR. |

The RTC interface register RTC0KEY is a lock and key register that is operable to protect the interface 420. This register must be written with the correct key codes, in sequence, by the CPU 102 before Writes and Reads to the internal address register RTC0ADR and the internal data register RTC0DAT of the internal registers 418. The key codes are 0xa5, 0xf1. There are no timing restrictions, but the key codes must be written in order. If the key codes are written out of order, the wrong codes are written, or an invalid Read or Write is attempted, further Writes and Reads to RTC0ADR and RTC0DAT will be disabled until the next system reset. Reading of the RTC0KEY register at any time will provide to the interface status of the RTC 116, but does not interfere with the sequence that is being written. The RTC0KEY register is an 8-bit register that provides four status conditions. The first is a lock status, indicating that the two key codes must be sequentially written thereto. After the first key code is written, the status will change to the next status indicating that it is still locked, but that the first key code has been written and is waiting for the second key. The next status is wherein the interface is unlocked, since the first and second key codes have been written in sequence. The fourth status indicates that the interface is disabled until the next system reset. The RTC0KEY register is located at the SFR address 0xAE and, when writing thereto, the first key code 0xA5 is written followed by the second key code 0xF1, which unlocks the RTC interface. When the state indicates that it is unlocked, then any Write to the RTC0KEY register will lock the RTC0 interface.

The RTC internal registers 418 can be read and written using the RTC0ADR and RTC0DAT interface registers. The RTC0ADR register selects the particular RTC internal register that will be targeted by subsequent Reads/Writes to RTC0DAT. Prior to each Read or Write, the RTC interface Busy bit, bit 7 therein, should be checked to make sure the RTC interface is not busy performing another Read or Write operation. An example of an RTC Write to an internal register would involve a Wait operation when the Busy bit indicates it is busy. Thereafter, the RTC0ADR would be written with the value of, for example, 0x06, which would correspond to an internal RTC address of 0x06. This will be followed by a Write of a value of, for example, 0x00 to RTC0DAT which will Write the value 0x00 to the RTC0CN internal register (associated with the internal 0x06 address), which RTC0CN register is the RTC control register. There are generally in this embodiment, sixteen 8-bit internal registers. There are six internal registers for the captured data from the timer 410, one register for the RTC0CN control information, six alarm registers, and a back-up RAM address register and a back-up RAM data register. By first writing the control information to RTC0CN, this can be followed by writing or reading data from any of the other internal registers. To write to any of the other registers, the RTC0CN internal register has the Busy bit written thereto in order to initiate an indirect Read by the CPU 102. Once the Read is performed by the CPU 102, then the contents of RTC0DAT are loaded with the contents of RTC0CN. The system can be set such that there will be a sequence of indirect Reads by setting the appropriate bit in the control register. These will be provided with a series of consecutive Reads such that, for example, the contents of either the capture registers or the alarm registers can be completely read out. The RTC0ADR register will automatically increment after each Read or Write to a capture or alarm register. The RTC0CN register is an 8-bit register and has an enable bit, a missing clock detector enable bit, a clock fail flag bit, a timer run control bit indicating that the timer either holds its current value or increments every RTC clock period, an alarm enable bit that is operable to enable the alarm function, a set bit that causes the value in the timer registers, the capture registers, to be transferred to the RTC timer for initialization purposes and the capture bit that causes the contents of the 48-bit RTC timer to be transferred to the capture registers. There is also provided an oscillator control register, RTC0XCN, which is an 8-bit register providing for gain control of the crystal oscillator, a mode select bit for selecting whether the RTC will be used with or without a crystal, a bias control bit that will enable current doubling, a clock valid bit that indicates when the crystal oscillator is nearly stable and a $V_{BAT}$ indicator bit. When this is set, it indicates that the RTC is powered from the battery.

The RTC timer 410 is, as described herein above, a 48-bit counter that is incremented every RTC clock, when enabled for that mode. The timer has an alarm function associated therewith that can be set to generate an interrupt, reset the entire chip, or release the internal oscillator in block 112 from a suspend mode at a specific time. The internal value of the 48-bit timer can be preset by storing a set time and date value in the capture internal registers and then transferring this information to the timer 410. The alarm function compares the 48-bit value in the timer on a real time basis to the value in the internal alarm registers. An alarm event will be triggered if the two values match. If the RTC interrupt is enabled, the CPU 102 will vector to the interrupt service routine when an alarm event occurs. If the RTC operation is enabled as a reset source, the MCU will be reset when an alarm event occurs. Also, the internal oscillator 112 will be awakened from suspend mode, if in that mode, on an RTC alarm event.

Figure 5:
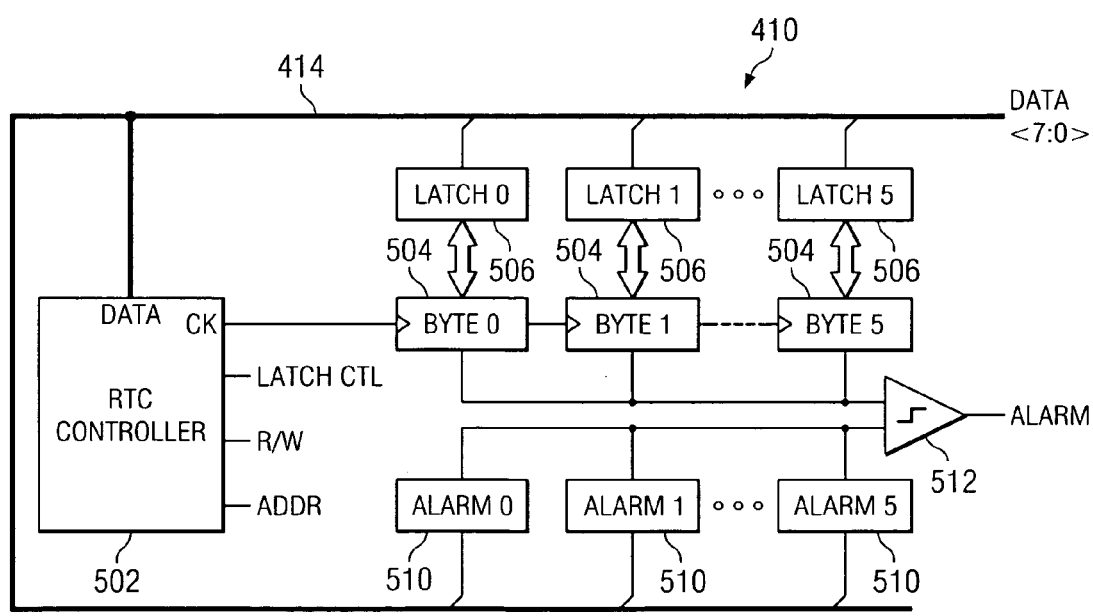
FIG. 5 illustrates a block diagram of the registers in the RTC.

Referring now to FIG. 5, there is illustrated a more detailed diagram of the 48-bit timer 410. The overall operation of the RTC, that associated with the RTC oscillator 402, RTC state machine 412 and various registers is illustrated in a single block 502 as an RTC controller. This allows generation of a clock and the various control functions, addresses, etc. The basic timer is comprised of six 8-bit counters 504, each providing a byte of information. They are labeled BYTE0, BYTE1, ..., BYTE5. This provides a total of 48 bits. Each of the counters 504 is addressed indirectly such that the contents thereof can be read out to an associated latch 506, there being six latches 506, for either transferring information thereto or reading data therefrom (these being the capture registers in the internal registers 418). For a capture operation, where information in the timer, i.e., the current time and date, is to be output, the data will be transferred from the counters 504 to the latches 506. When the counters are to be initialized, a new count value will be transferred from the latches 506 to the counters 504. The first counter BYTE0 is clocked by a clock input from the controller 502, this being generated by the RTC oscillator 402 in FIG. 4. Each counter output will feed the next counter in a conventional manner. The first counter 504 labeled BYTE0 provides a resolution of 1/65536 seconds, the second counter 504 labeled BYTE1 provides a resolution of 1/256 seconds, the third counter 504 labeled BYTE2 provides a resolution of 1 second, the fourth counter 504 labeled BYTE3 provides a resolution of 256 seconds, the fifth counter 504 labeled BYTE4 provides a resolution of 65536 seconds and the last counter 504 labeled BYTE5 provides a value of 16,777,216 seconds.

Each of the latches 506 is interfaced to the internal 8-bit data bus 414 to allow data to be output therefrom and transferred to the capture internal registers, there being six of those registers. Therefore, each of the associated latches 506 will be consecutively addressed, they having a unique address in the address space of the RTC 116, and the outputs thereof then stored in the associated capture registers. There are also provided six alarm registers 510, each associated with one of the bytes in the counters 504, they being 8-bit alarm registers to provide a 48-bit alarm value. This alarm value is compared with the current value of the counters 504 with a comparator 512 to provide an alarm output if there is a true match. This is utilized, as noted herein above, to generate the alarm.

Figure 6:
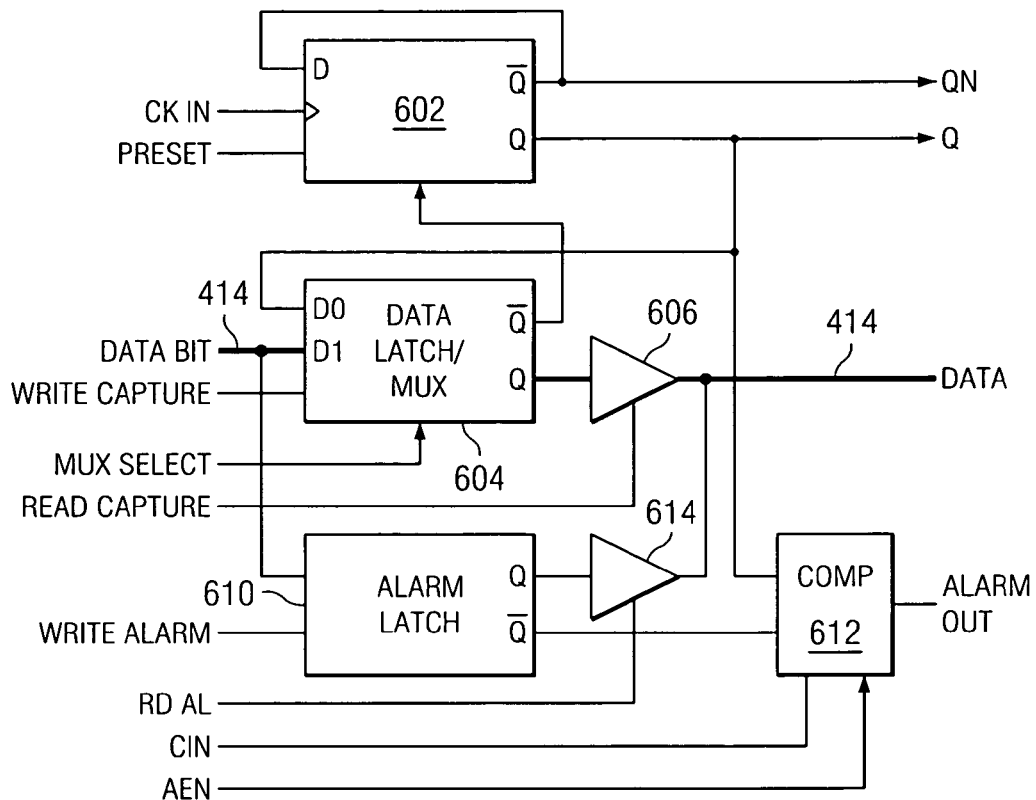
FIG. 6 illustrates a logic diagram for one bit of the register.

Referring now to FIG. 6, there is illustrated a logic diagram for a bit of counter 504. This bit is illustrated as being the first bit and, therefore, the output from the clock will clock this. However, after this bit, each bit is clocked by the falling edge of the previous counter or the Q-Bar output thereof. The clock input is input to a toggle flop 602 on the clock input thereof. The data input thereof is connected to the Q-Bar output thereof. This provides the input to the clock input of the next bit of counter 504. The Q-Bar output thereof is input to the D0 data input of a data latch/multiplexer 604, which is operable to be controlled by a multiplexer select signal to select the output of the flop 602 during a capture operation. During the capture operation, the Write signal will be received as a Write Capture signal that will cause the data on the D0 data input to be latched when data is to be captured from the counter 602. In a preset operation where the time and date are to be preset, data from the databus 414 is written to the multiplexer 604 on a D1 data input. To read the contents of the data latch/multiplexer 604, a Read capture signal enables a Read buffer 606 to read the Q-output of the data latch/multiplexer 604. This is output on the databus 414 during a Read operation. Therefore, by selecting the appropriate port D0 or D1, data can be latched into the data latch/multiplexer 604 with the multiplexer select signal to either latch input data for a preset operation or capture the output data of the counter 504 at the flop 602 for output therefrom.

In order to write data to the flop 602, the Q-Bar output of the data latch/multiplexer 604 is input to a reset input on the input of the flop 602. Whenever a preset signal is present to the flop 602, the data state of the flop 602 can be forced either high or low corresponding to the output of the latch/multiplexer 604. This allows the bit-value thereof to be "preselected."

For the alarm mode, data is written into an alarm latch 610 with a Write Alarm signal. This is basically a D-type flip-flop. The Q-Bar output thereof is input to one input of a comparator 612, after latching the value therein, the other input thereof connected to the Q-output of the toggle flop 602 associated with the counting operation. Therefore, the particular associated bit of the timer can be compared to the fixed bit for the alarm word in the 48-bit alarm word. A true compare depends on the previous alarm compare result of the previous bit being valid, such that if all bits are valid, then the entire alarm compare operation will be a true alarm operation. Therefore, when the Q-Bar output of flop 602 matches the contents of latch 610 and the previous bit had true comparison, then there will be an alarm output true. This is all enabled with an alarm enable signal. Additionally, the contents of the alarm latch 610 can be read with a Read buffer 614 that is enabled with an alarm Read signal to output the contents of the latch 610 onto the bus 414.

Figure 7:
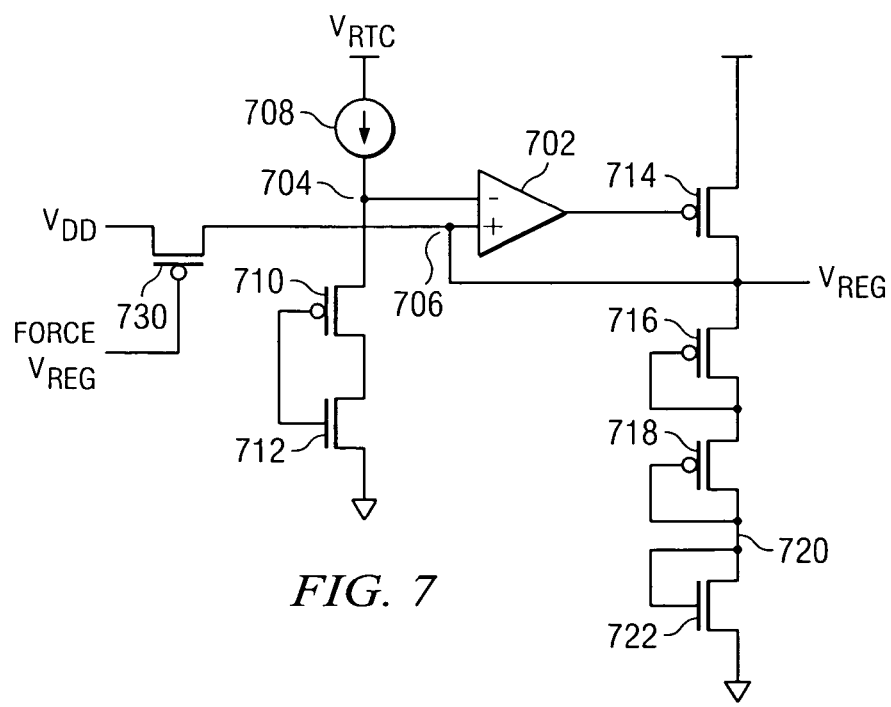
FIG. 7 illustrates a schematic diagram for the on-chip regulator.

Referring now to FIG. 7, there is illustrated a schematic diagram of the on-chip regulator associated with the RTC operation. This allows either the supply voltage to be applied to the Real Time Clock or a regulated voltage applied thereto. An amplifier 702 has the negative input thereof connected to a node 704 and the positive input thereof connected to a node 706. Node 704 is connected to one side of a current source 708, the other side thereof connected to the voltage $V_{RTC}$, this being the voltage supplied to the RTC circuit. Node 704 is connected to one side of two series connected load transistors, a p-channel transistor 710, the source/drain path thereof connected between node 704 and one side of the source/drain path of an n-channel transistor 712, the other side thereof connected to ground. The gates of transistors 710 and 712 are connected together. The output of amplifier 702 drives the gate of a p-channel transistor 714, the source/drain path thereof connected between the RTC supply voltage and the node 706, the node 706 providing the output voltage $V_{REG}$. Node 706 is also connected to ground through three series connected transistors, comprised of two series connected p-channel transistors 716 and 718 connected in a diode configuration together between node 706 and a node 720, node 720 connected through a diode-connected n-channel transistor 722 to ground.

Node 706 is also connected to one side of the source/drain of a p-channel transistor 730, the other side thereof connected to $V_{DD}$ and the gate thereof connected to the Force $V_{REG}$ signal. When the Force $V_{REG}$ signal is low, transistor 730 conducts and $V_{DD}$ is connected to node 706. When Force $V_{REG}$ is high, $V_{DD}$ is disconnected from node 706 and the amplifier 702 will regulate the voltage on node 706 to that on node 704.

Figure 8:
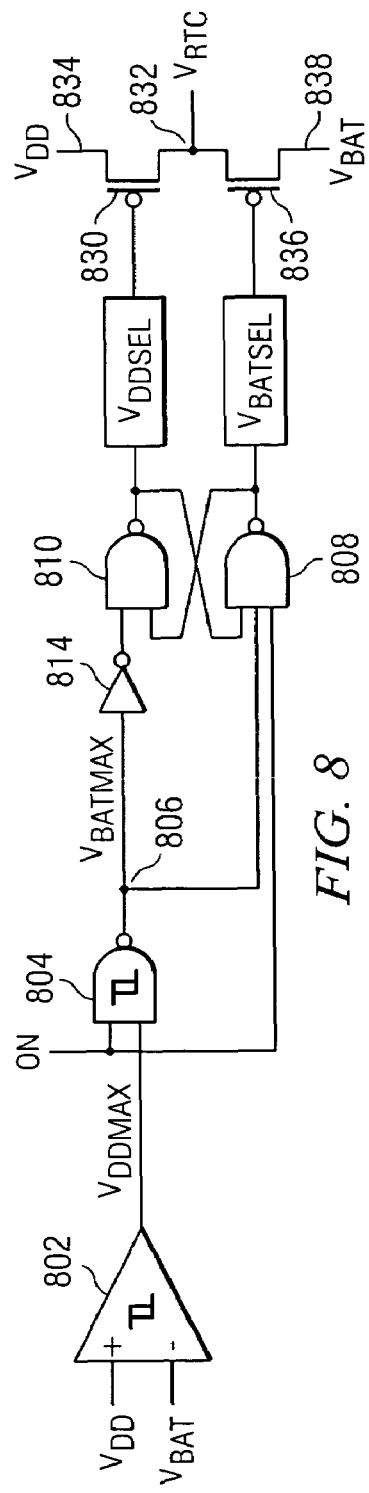
FIG. 8 illustrates a logic diagram for the power switch over device.

Referring now to FIG. 8, there is illustrated a logic diagram for the switch over logic. As noted herein above, the switch over logic is operable to monitor the input supply voltage $V_{DD}$ and the input battery voltage $V_{BAT}$. These are input to the positive and negative inputs of a comparator 802, respectively. The output of this is $V_{DDMAX}$. This is input to one input of a NAND gate 804, the other input thereof connected to an enable signal. The output of the NAND gate 804 is provided on a node 806 and this comprises the $V_{BATMAX}$ signal. Therefore, when the output of comparator 802 is true, this indicates that $V_{DD}$ is present or the highest voltage. When it is not present, or lower than the battery voltage, the output of the NAND gate 804 on node 806 will indicate that the battery is present or the higher voltage. A latch is provided comprised of two NAND gates 808 and 810. One input of NAND gate 810 is driven by the signal on node 806 inverted through inverter 814. The other input of NAND gate 810 is connected to the output of NAND gate 808. One input of NAND gate 808 is connected to node 806, the other input thereof connected to the output of NAND gate 810. NAND gate 808 is a 3-input NAND gate with the other input thereof connected to the enable signal "ON" to enable the operation thereof. The output of NAND gate 810 comprises a $V_{DDSEL}$ signal and the output of NAND gate 808 comprises the battery select signal, $V_{BATSEL}$. The signal $V_{DDSEL}$ is input to the gate of a p-channel transistor 830, which is a pass transistor connected between an RTC voltage supply node 832, $V_{RTC}$, and $V_{DD}$ on a $V_{DD}$ node 834. The $V_{BATSEL}$ signal is connected to the gate of a p-channel pass transistor 836, the source/drain path thereof connected between the node 832 and a battery node 838, connected to the battery of voltage $V_{BAT}$. The switch over circuit is utilized for the purpose of selecting either the supply voltage on the supply input pin or battery voltage on the battery input pin for powering node 832. These are conventional circuits.

Figure 9:
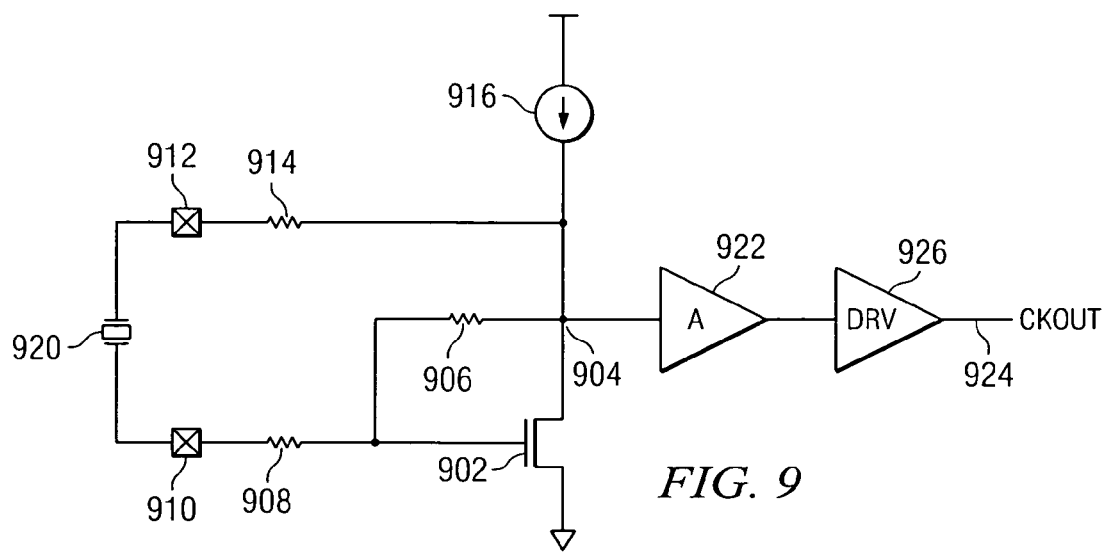
FIG. 9 illustrates a schematic diagram for the RTC oscillator in the crystal oscillation mode.

Referring now to FIG. 9, there is illustrated a schematic diagram of one configuration of the RTC oscillator. In general, this is a conventional oscillator construction configured as a crystal oscillator. An oscillator n-channel transistor 902 is provided connected between an output node 904 and ground. A feedback resistor 906 is connected between the node 904 and the gate of transistor 902. The gate of transistor 902 is connected through a resistor 908 and a first crystal terminal 910. A second crystal terminal 912 is connected through a series resistor 914 to the node 904. Node 904 is driven with a current source 916 from a supply voltage. A crystal 920, being external to the chip, is connected between the first and second crystal terminals 910 and 912. When the crystal 920 is disposed as such, this will control the oscillation of the oscillator. The node 904 drives an amplifier 922, which then drives the clock output on a node 924 through a driver 926. This is a conventional oscillator circuit.

Figure 10:
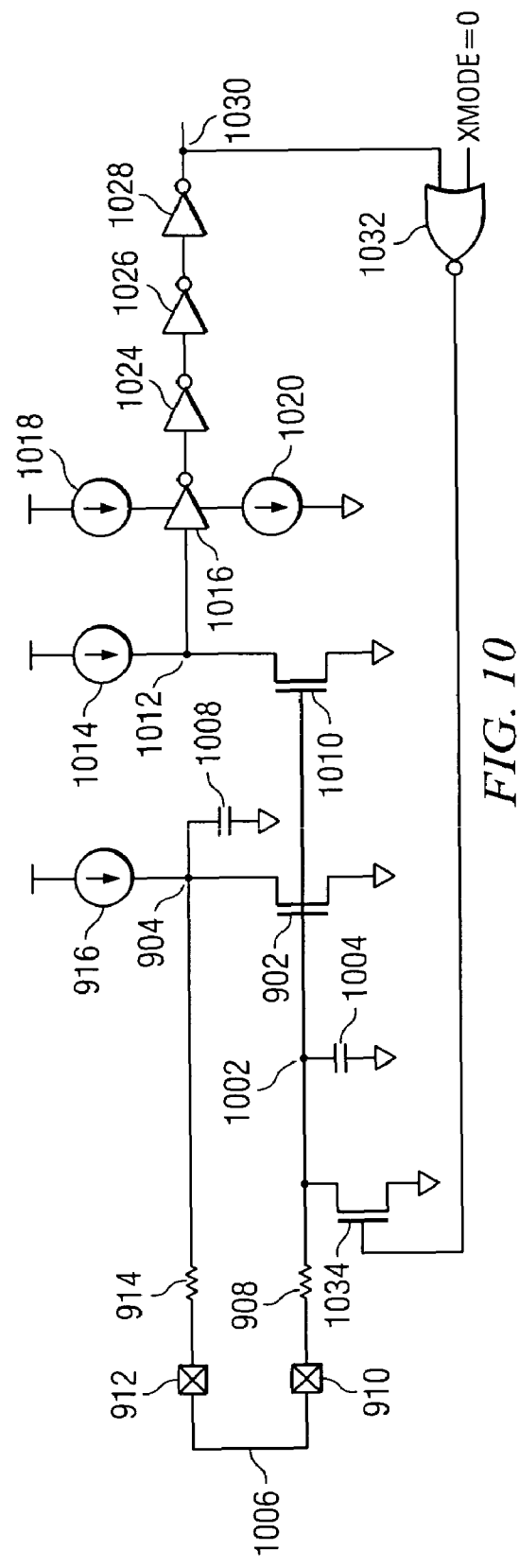
FIG. 10 illustrates a schematic diagram of the RTC oscillator in the non-crystal oscillation mode.

Referring now to FIG. 10, there is illustrated a schematic diagram of a configuration where the oscillator is configured to run without a crystal. In this configuration, the transistor 902 has the gate thereof connected to a node 1002, which has a capacitor 1004 connected between node 1002 to ground. The first and second crystal input pins 910 and 912 are connected together with an external short circuit 1006. A capacitor 1008 is connected between node 904 and ground. The gate of transistor 902 on the node 1002 also drives the gate of an n-channel transistor 1010, the source/drain path thereof connected between a node 1012 and ground. Node 1012 is driven by a current source 1014, node 1012 driving a current limiting amplifier 1016. Current limiting amplifier 1016 is limited with a positive current source 1018 and a negative current source 1020. Amplifier 1010 drives three series connected buffer amplifiers 1024, 1026 and 1028, to drive a node 1030. Node 1030 is input to one input of a two input NOR gate 1032, the output thereof driving the gate of an n-channel transistor 1034. The source/drain path of transistor 1034 is connected between node 1002 and ground.

The CPU core has a number of power management modes, these power management modes being two software programmable power management modes. The first mode is an idle mode and the second is a stop mode. In the idle mode, the operation of the CPU is halted while leaving the peripherals and internal clocks active. Therefore, the timers, data converters and the high frequency precision clock and the low frequency clock remain active. In the stop mode, the CPU is halted, such that it does not incur any transition to the digital circuitry associated therewith, all interrupts and timers are placed in an inactive mode, and the operation of the internal oscillator is stopped. The analog peripherals will remain in their selected states. Since the clocks are running in the idle mode, power consumption is dependent upon the system clock frequency and the number of peripherals left in active modes before entering idle mode. In the stop mode, the least power is consumed. There is provided an internal power control register, that being an 8-bit register. Bit 0 provides the idle mode and bit 1 provides the stop mode, with the remaining bits in reserve. When either bit 1 or bit 2 is high (not both), then the appropriate mode will be selected. Writing of a logic "1" to either of the bits will select the appropriate mode and force the processor into that mode. Additionally, the power can be changed by selecting between the high frequency crystal control for a precision oscillator and the low frequency oscillator. The high frequency or precision oscillator typically operates in the 24 MHz range and the low frequency clock operates on the order of 80 kHz. With the lower clock frequency, less power will be consumed by the digital circuitry due to the fact that less transitions will occur in the digital circuitry. Even in the stop mode, when the processor is substantially inactive, the RTC will remain running and will clock into the internal timer and maintain a running time value. This will be so even that if power is removed from the supply voltage terminal, as there is a backup battery provided. Further, the operation thereof is a very low power operational mode.

Although the preferred embodiment has been described in detail, it should be understood that various changes, substitutions and alterations can be made therein without departing from the spirit and scope of the invention as defined by the appended claims.

What is claimed is:

1. A microcontroller unit (MCU) with a stand-alone Real Time Clock (RTC), comprising:
   a processing circuit for receiving digital information and processing said received digital information;
   a primary clock circuit for providing the timing for said processing circuit;
   a power control circuit for controlling the power to said processing circuit and said primary clock circuit to control the operation thereof to operate in at least a full power mode drawing a full power level from a supply voltage input and a reduced power mode drawing less than the full power level from said supply voltage input; and
   a stand-alone RTC circuit, said stand-alone RTC circuit including:
      an RTC clock circuit operating independent of said primary clock circuit, a timer for being clocked by said RTC clock circuit to increment a stored time value for output therefrom, said RTC clock circuit having a defined time base, an input/output (I/O) device for allowing access by said processing circuit to the results output by said timer, circuitry for controlling by at least one of two different and separate processes said processing circuit to facilitate changing said processing circuit and said primary clock circuit from operating in an inactive mode or a deep sleep mode to an active mode, said two different processes being configurable and including at least one interrupt process for generating an interrupt to said processing circuit or controlling said primary clock circuit to begin clocking, and power management circuitry for managing the power to said stand-alone RTC circuit, such that said RTC clock circuit, said timer, and said I/O device operate regardless of the power mode of operation of said processing circuitry and said primary clock circuit.

2. The MCU of claim 1, wherein said primary clock circuit operates on either a first high clock frequency or a second and lower clock frequency wherein said processing circuit draws more power when operating under said high clock frequency and said power control circuitry is operable to operate said processing circuitry on said lower clock frequency during said reduced power mode.

3. The MCU of claim 1, wherein said power control circuitry is operable to suspend the operation of said primary clock circuit during said reduced power mode to operate at said reduced power mode.

4. The MCU of claim 1 and further comprising a multiplexer for allowing said processing circuitry to operate with said RTC clock circuit.

5. The MCU of claim 1, wherein said power control circuitry operates in said reduced power mode at a substantially zero power draw of power from said supply voltage input by at least said processing circuit.

6. The MCU of claim 1, wherein said I/O device in said RTC circuit includes a latch for storing the results of said timer in response to receiving a latch signal, said latch interfaced such that access thereto is provided to said processing circuit.

7. The MCU of claim 6, and further comprising a buffer memory for buffering the contents of said latch for output therefrom to said processing circuit upon a Read command received from said processing circuit.

8. The MCU of claim 6, and further comprising a Write input to said latch, such that said processing circuit is able to write information to said latch, with update circuitry provided in said RTC circuit for allowing the contents of said latch written thereto by said processing circuitry to be loaded as an initial value in said timer to adjust the value therein.

9. The MCU of claim 1, wherein said RTC circuit further includes an alarm circuit for comparing a predetermined alarm value with the results output from said timer and, as a true comparison is made, generating an indication of such comparison as an output to said processing circuit for taking a predetermined action thereon.

10. The MCU of claim 9, wherein said alarm is programmable by said processing circuit.

11. The MCU of claim 1, wherein said power management circuit includes a battery backup supply for providing battery backup to said RTC circuit if power is removed from said supply voltage input such that power is not interrupted to said RTC circuit.

12. A microcontroller unit (MCU) with a stand-alone Real Time Clock (RTC), comprising:

a processing circuit;

a primary clock circuit for providing the timing for said processing circuit;

a power control circuit for controlling the power to said processing circuit and said primary clock circuit to control the operation thereof to operate in at least a full power mode drawing power at a first power level from a supply voltage input and a reduced power mode drawing less than the first power level from said supply voltage input; and a stand-alone RTC circuit, said stand-alone RTC circuit including:

an RTC clock circuit having a defined time base;

a timer for being clocked by said RTC clock circuit to increment a stored time value for output therefrom, and a control output for allowing said RTC to control the operation of said power control circuit, said control output comprises circuitry for controlling by at least one of two different and separate processes to said processing circuit for changing said processing circuit and said primary clock circuit modes each from an inactive mode or a deep sleep mode to another mode, said two different processes being configurable and including at least one interrupt process for generating an interrupt to said processing circuit or controlling said primary clock circuit to begin clocking.

13. The MCU of claim 12, wherein said power control circuit includes an interrupt handler for initiating an interrupt routine in said processing circuitry in response to the generation of said interrupt by said control output circuit in said RTC circuit.

14. The MCU of claim 13, wherein said interrupt circuit operates to compare the contents of said timer with a prestored alarm value and generate said interrupt when the contents of said timer exceed said contents.

15. The MCU of claim 12, wherein said primary clock circuit operates in a suspend mode such that it will provide no timing operation to said processing circuitry and said control output is operable to cause said primary clock circuit to terminate the suspend mode and resume normal operation.

16. The MCU of claim 12, wherein said RTC circuit includes an input/output (I/O) device for allowing access by said processing circuit to the results output by said timer.

17. The MCU of claim 12, wherein said RTC circuit includes power management circuitry for managing the power to said stand-alone RTC circuit, such that said RTC clock circuit, said timer, and said I/O device operate regardless of the power mode of operation of said processing circuitry and said primary clock circuit.

18. A Real Time Clock (RTC) circuit disposed on a semiconductor circuit with a processing circuit having an associated primary clock circuit for providing the timing therefor with the power thereto controlled by power control circuitry to control the operation thereof to operate in at least a full power mode drawing a full power level from a supply voltage input and a reduced power mode drawing less than the full power level from said supply voltage input, comprising:

an RTC clock circuit operating independent of the primary clock circuit, a timer for being clocked by said RTC clock circuit to increment a stored time value for output therefrom, said RTC clock circuit having a defined time base, an input/output (I/O) device for allowing access by the processing circuit to the results output by said timer, control circuitry for controlling by at least one of two different and separate processes said processing circuit and facilitating a change of said processing circuit and said primary clock from a less than full power mode to another mode said two different processes being configurable and including at least one interrupt process for generating an interrupt to said processing circuit or controlling said primary clock circuit to begin clocking, and power management circuitry for managing the power to said stand-alone RTC circuit, such that said RTC clock circuit, said timer, and said I/O device operate regardless of the power mode of operation of the processing circuitry and the primary clock circuit.

19. The RTC of claim 18, wherein the primary clock circuit operates on either a first high clock frequency or a second and lower clock frequency wherein the processing circuit draws more power when operating under said high frequency and said power control circuitry is operable to operate the processing circuitry on said lower clock frequency during said reduced power mode.

20. The RTC of claim 18, wherein said power control circuitry is operable to suspend the operation of the primary clock circuit during said reduced power mode to operate at said reduced power mode.

21. The RTC of claim 18 and further comprising a multiplexer for allowing said processing circuitry to operate with said RTC clock circuit.

22. The RTC of claim 18, wherein said power control circuitry operates in said reduced power mode at a substantially zero power draw of power from said supply voltage input by at least the processing circuit.

23. The RTC of claim 18, wherein said I/O device includes a latch for storing the results of said timer in response to receiving a latch signal, said latch interfaced such that access thereto is provided to the processing circuit.

24. The RTC of claim 23, and further comprising a buffer memory for buffering the contents of said latch for output therefrom to the processing circuit upon a Read command received from the processing circuit.

25. The RTC of claim 23, and further comprising a Write input to said latch, such that the processing circuit is able to write information to said latch, with update circuitry provided for allowing the contents of said latch written thereto by the processing circuitry to be loaded as an initial value in said timer to adjust the value therein.

26. The RTC of claim 18, further including an alarm circuit for comparing a predetermined alarm value with the results output from said timer and, as a true comparison is made, generating an indication of such comparison as an output to the processing circuit for taking a predetermined action thereon.

27. The RTC of claim 26, wherein said alarm is programmable by the processing circuit.

28. The RTC of claim 18, wherein said power management circuit includes a battery backup supply for providing battery backup to the RTC circuit if power is removed from the supply voltage input such that power is not interrupted to the RTC circuit.

* * * * *